Jan. 4, 1949.  O. J. MILLIKEN  2,458,400
ADJUSTABLE DRIVE MECHANISM FOR TRACTORS
Filed Feb. 1, 1946  2 Sheets-Sheet 1
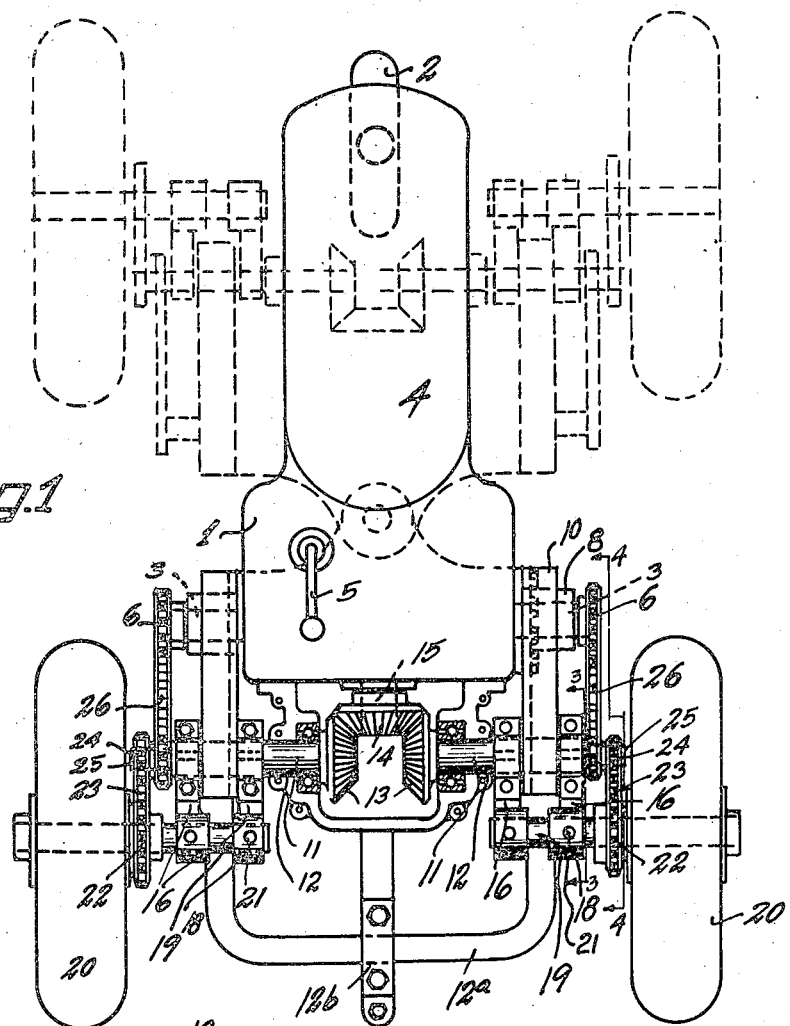
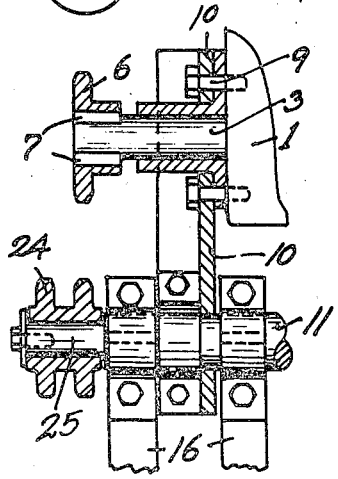
INVENTOR
Owen J. Milliken
BY
ATTORNEY Jan. 4, 1949.  O. J. MILLIKEN  2,458,400
ADJUSTABLE DRIVE MECHANISM FOR TRACTORS
Filed Feb. 1, 1946  2 Sheets-Sheet 2
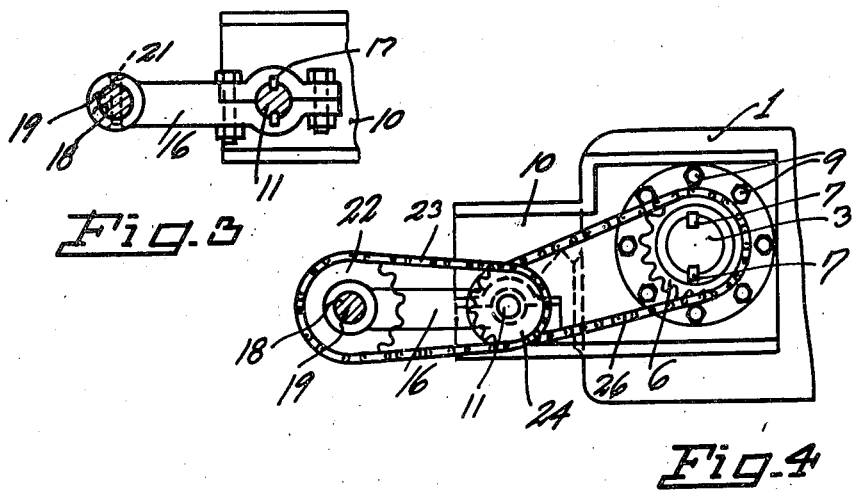
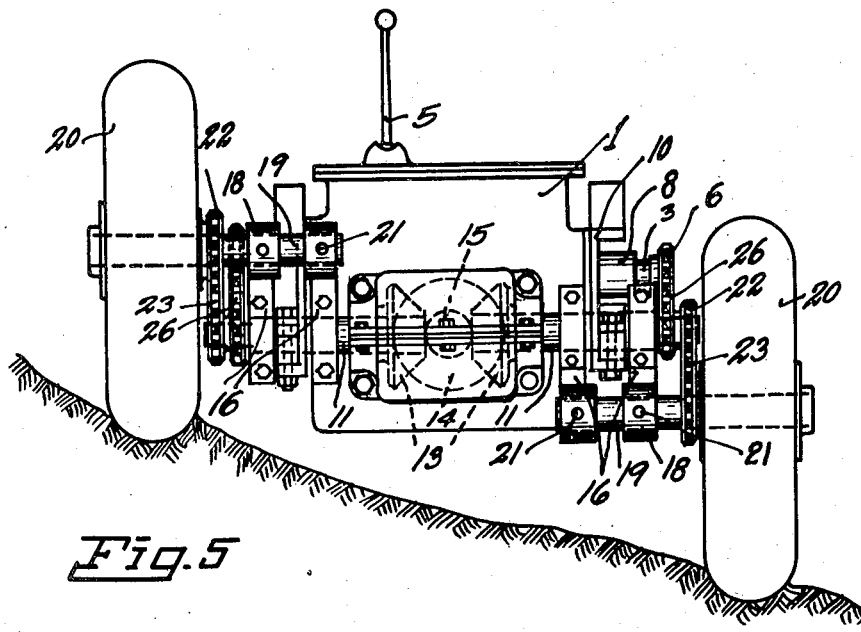
INVENTOR
Owen J. Milliken
BY
ATTORNEY Patented Jan. 4, 1949

2,458,400

UNITED STATES PATENT OFFICE 2,458,400

ADJUSTABLE DRIVE MECHANISM FOR TRACTORS

Owen J. Milliken, Davenport, Wash.

Application February 1, 1946, Serial No. 644,909

2 Claims. (Cl. 180—41)

This invention relates to tractors and more particularly to the driving wheels at the rear end of the tractor, it being one object to provide the tractor with rear driving wheels mounted in such manner that they may be vertically adjusted and thus allow the tractor to be used upon level ground or driven transversely of a hill without likelihood of the tractor slipping and skidding down the hill instead of moving in a straight line across the hilly ground.

Another object of the invention is to provide a tractor with driving wheels caried by axles which are so mounted that they may be swung vertically and moved in opposite directions and the wheels thus so adjusted that the body of the tractor will be held in a horizontal plane when driven across a side of a hill. Therefore the wheels will be pressed downwardly into the ground by the weight of the tractor and the tractor will not have a tendency to slide down hill as the tractor moves across a field.

Another object of the invention is to provide a tractor having its rear drive wheels so mounted that vertical swinging adjustment may be accomplished by mechanism under control of the operator riding the tractor.

Another object of the invention is to provide a tractor wherein the axles of the drive wheels are connected with shafts by arms fixed to the shafts so that when the shafts are turned the axles and the wheels will be swung to vertical positions, rotary motion being transmitted to the wheels from a power shaft of the tractor by sprocket chains trained about sprockets carried by the wheels and by the shafts carrying the arms by means of which the axles of the wheels are mounted for swinging adjustment.

Another object of the invention is to provide a tractor wherein the mechanism for mounting and driving the drive wheels is so constructed that the tractor may be provided with either a two-wheel drive or a four-wheel drive.

Another object of the invention is to provide a tractor having mechanism for mounting and driving the drive wheels which is compact and very efficient in operation and not liable to become broken or get out of order.

The invention is illustrated in the accompanying drawings wherein:

Fig. 1 is a top plan view of the improved tractor.

Fig. 2 is a fragmentary view showing the driving sprockets and shafts.

Fig. 3 is a fragmentary view taken along the line 3—3 of Figure 1.

Fig. 4 is a view taken along the line 4—4 of Figure 1.

Fig. 5 is a rear view of the tractor.

The tractor has a body 1 provided at its front end with a wheel 2 with which conventional steering mechanism (not shown) is associated so that the tractor may be steered in the usual way by an operator riding the tractor. A power shaft 3 extends transversely of the rear end portion of the tractor and rotary motion is transmitted to this shaft in the usual manner from the engine 4 of the tractor. Conventional transmission mechanism is provided for rotating the power shaft which is of the differential type and gears of the transmission mechanism are adjusted by means of the usual gear shift lever 5. The ends of the drive shaft project from opposite sides of the tractor and these protruding ends of the power shaft carrying sprocket wheels 6 which are fixed to the power shaft by keys 7 so that they turn with the power shaft. Sleeves 8 are provided at opposite sides of the tractor with the drive shaft passing through them and these sleeves are secured by bolts 9 which also serve as fasteners for supports 10. The supports project rearwardly from the tractor and through their projecting rear portions are mounted shafts 11 which are rotatably mounted through bearings 12 and have beveled gears or pinions 13 at their inner ends which mesh with opposite side portions of a beveled gear 14 carried by the power-takeoff shaft 15 of the tractor. A bar 12a extends from the supports 10 and supports a draw bar 12b to which plows, harrows or the like may be attached. When the shaft 15 is rotated the shafts 11 are turned in opposite directions and the arms 16 carried by one shaft will be swung vertically in a direction opposite to that in which the arms of the other shaft move. The arms 16 are mounted about the shafts 11 as shown in Figure 3 and fix to the shafts by keys 17 so that they will be swung vertically when the shafts are turned. Free ends of the arms are provided with bearings 18 and through these bearings are mounted shafts or axles 19 for the wheels 20, the shafts 19 being held against turning in the bearings 18 by pins 21 so that the axles will be prevented from turning with the wheels. The hubs of the wheels carry sprocket wheels 22 about which are trained sprocket chains 23 and these chains are also trained about the double sprockets 24 loosely carried by the reduced outer end portions 25 of the shafts 11. Other sprocket chains 26 are also trained about the double sprockets 24 and since the chains 26 are trained about the sprockets 6 carried by the power shaft rotary motion will be transmitted from the power shaft to the driving wheels when the lever 5 is moved into position to cause rotation of the power shaft.

When the tractor is in use the operator of the tractor adjusts the lever 5 to cause rotation of the power shaft 6 and the tractor will be driven forwardly. When travelling over level ground the two wheels 20 will be in the same plane, as shown in Figure 1, but when the tractor is moving across hilly ground transversely of a hill it is desirable to have the axles for the drive wheels out of horizontal alignment. In order to accomplish this the shaft 15 is set in motion and rotary motion transmitted to the shafts 11. This causes the shafts 11 to turn in opposite directions and one set of arms 16 will be swung upwardly while the other set of arms is swung downwardly. The shafts 19 will thus be shifted towards the position shown in figure 5 and the tractor may move across the hilly ground and the body of the tractor remain in a horizontal position. The wheels will also be held in an upright vertical position and will not have a tendency to slide downwardly along the sloping surface of the ground. Since rotation of the shafts 11 is under control of the operator of the tractor the wheels 20 may be shifted vertically whenever necessary without the operator alighting from the tractor and loss of time will be avoided. After hilly land has been crossed the wheels may be restored to the normal position in which their axles are in alignment and the tractor will move along a road or across level land in the usual manner.

For a tractor of the four-wheel drive type the mounting mechanism for the rear drive wheels may be duplicated at the front of the tractor, as indicated by dotted lines in Figure 1, and the front wheels mounted and driven in the same manner as the rear wheels. The mounting for the front wheels is not described in detail as it is the same as for the rear wheels and the dotted lines clearly show the same.

Having thus described the invention, what is claimed is:

1. In a tractor, a body, a rotary power shaft having end portions projecting from opposite sides of the body, a rotary power-takeoff shaft projecting from the rear end of the body, supports at opposite sides of the body projecting rearwardly therefrom, driven shafts rotatably mounted through the projecting rear portions of said supports and geared to the power-takeoff shaft for turning in opposite directions when the said power-takeoff shaft is rotating, double sprockets loosely mounted about outer end portions of the driven shafts, arms fixed to said driven shafts and normally extending rearwardly therefrom, axles carried by the arms and projecting from opposite sides of the tractor, drive wheels rotatably carried by outer end portions of said axles, sprockets carried by said wheels, sprockets carried by the protruding end portions of the power shaft, and sprocket chains trained about the double sprockets and about the sprockets of the power shaft and the wheels for transmitting rotary movement from the power shaft to the wheels, said driven shafts when rotated causing the arms to be swung vertically and the wheels moved vertically in opposite directions to adjusted positions for maintaining the tractor horizontal while traveling across a side of a hill.

2. In a tractor, a body, a rotary power shaft having end portions projecting from opposite sides of the body, a rotary power-takeoff shaft projecting from the rear end of the body, supports at opposite sides of said body, driven shafts rotatably mounted through said supports with outer ends protruding therefrom, arms fixed to said driven shafts and normally projecting horizontally therefrom, axles carried by said arms transversely thereof and projecting outwardly therefrom, drive wheels rotatably mounted upon said outer portions of said axles, sprocket wheels carried by the wheels and by outer end portions of the driven shafts and the power shaft, the sprockets of the driven shafts being loose thereof, chains trained about the sprocket wheels for transmitting rotary movement from the power shaft to said wheels, and means for rotating the driven shafts in opposite directions from the rearwardly projecting power-takeoff shaft and swinging the arms vertically in opposite directions to move the axles and the wheels carried thereby to vertically adjusted positions.

OWEN J. MILLIKEN.

REFERENCES CITED

The following references are of record in the file of this patent:

UNITED STATES PATENTS

| Number | Name | Date |
| --- | --- | --- |
| 1,316,232 | Haupt | Sept. 16, 1919 |
| 1,353,393 | Haupt | Sept. 21, 1920 |
| 1,451,194 | Adams | Apr. 10, 1923 |
| 1,451,627 | Munson | Apr. 10, 1923 |